(No Model.) 4 Sheets—Sheet 1.
C. J. VAN DEPOELE.
SLOTTED CONDUIT FOR ELECTRICAL CONDUCTORS.
No. 405,626. Patented June 18, 1889.
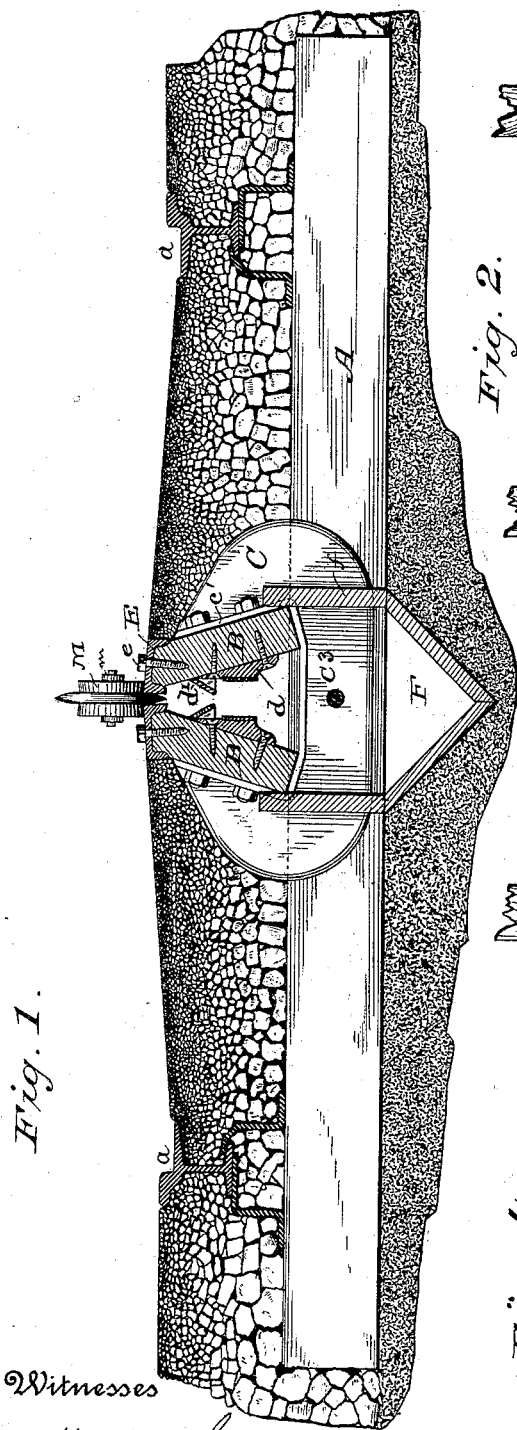
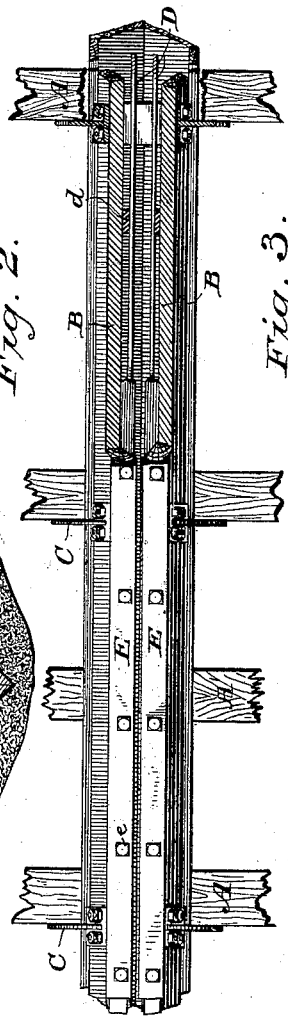
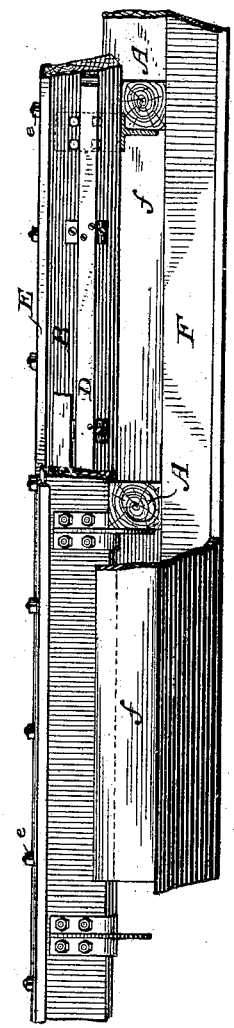
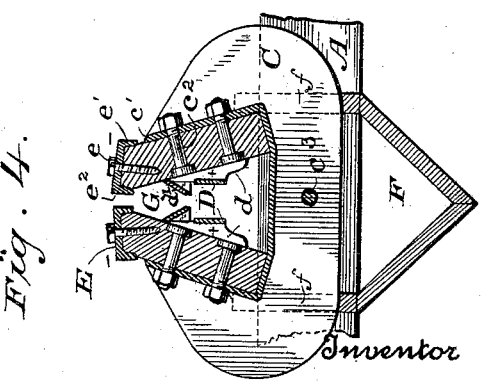
Witnesses
Inventor
Charles J. Van Depoele
By his Attorney (No Model.) 4 Sheets—Sheet 2.
C. J. VAN DEPOELE.
SLOTTED CONDUIT FOR ELECTRICAL CONDUCTORS.
No. 405,626. Patented June 18, 1889.
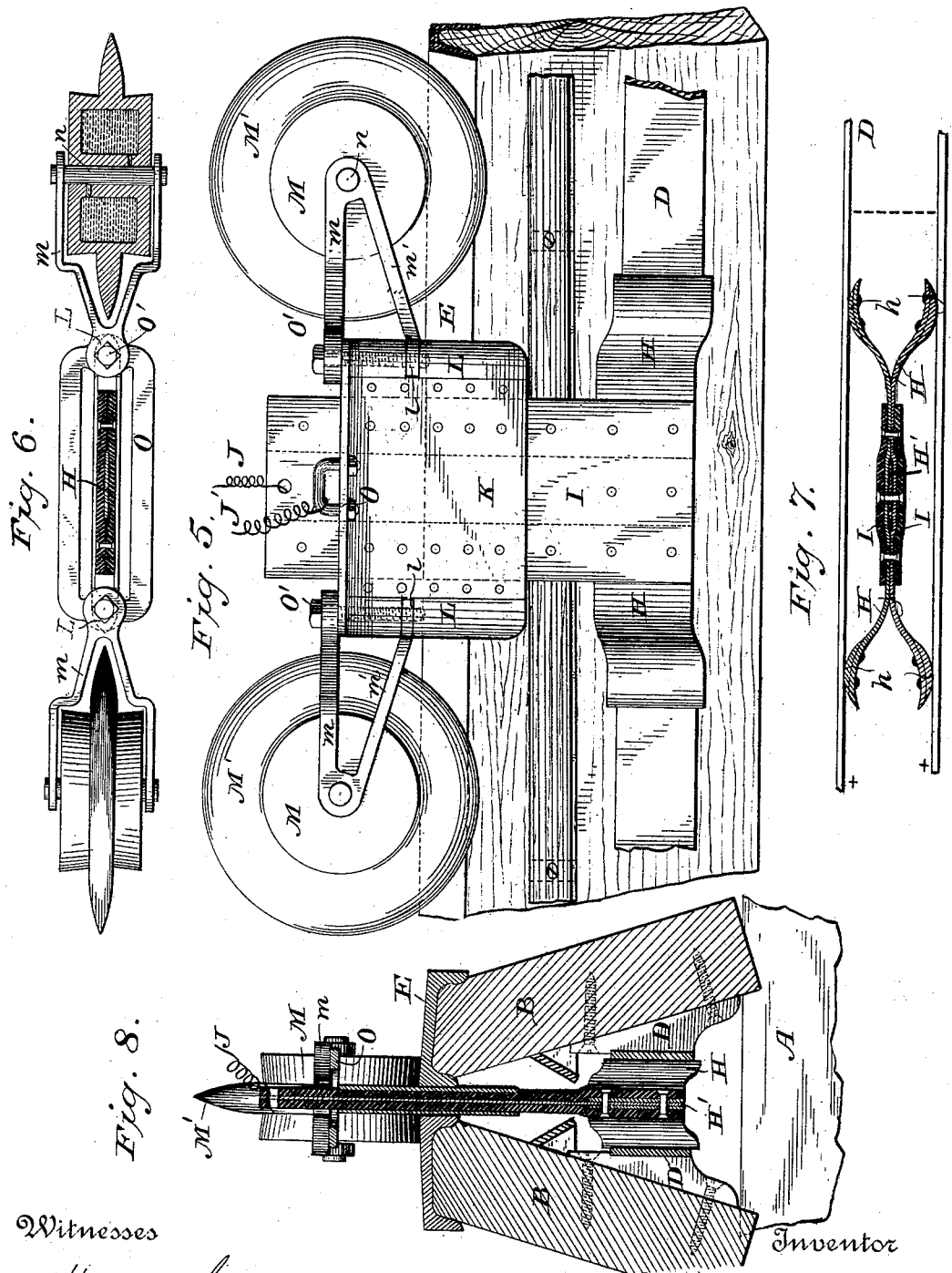
Witnesses
Inventor
Charles J Van Depoele
By his Attorney (No Model.)  4 Sheets—Sheet 3.
C. J. VAN DEPOELE.
SLOTTED CONDUIT FOR ELECTRICAL CONDUCTORS.
No. 405,626.  Patented June 18, 1889.
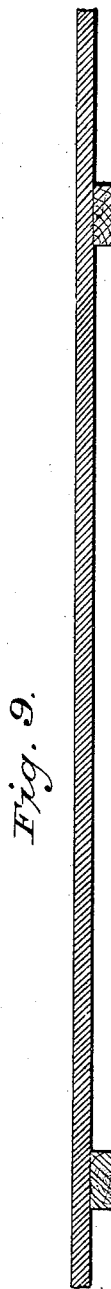
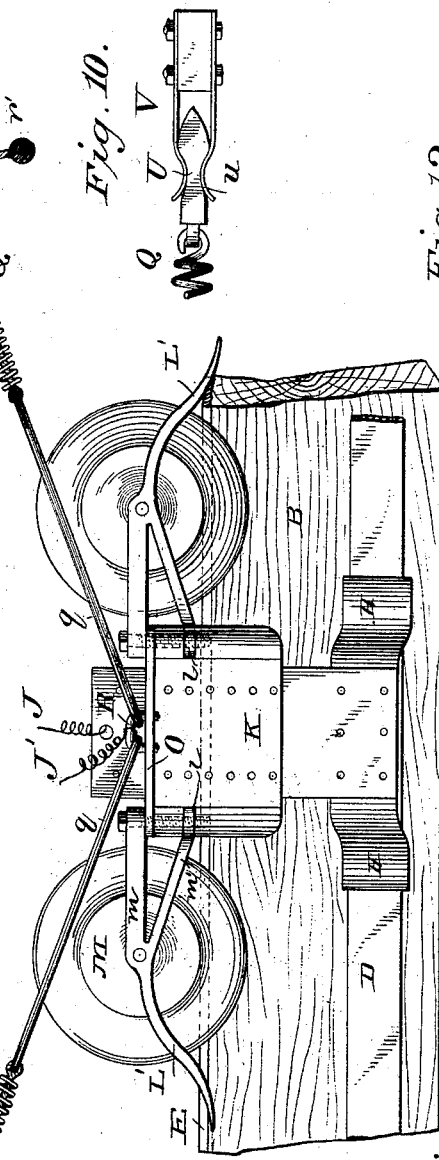
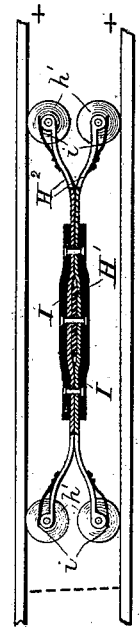
Witnesses
Wm A. Skinkle
Arthur Johnson
Inventor
Charles J Van Depoele
By his Attorney
Frankland Jannus (No Model.) 4 Sheets—Sheet 4.
C. J. VAN DEPOELE.
SLOTTED CONDUIT FOR ELECTRICAL CONDUCTORS.
No. 405,626. Patented June 18, 1889.
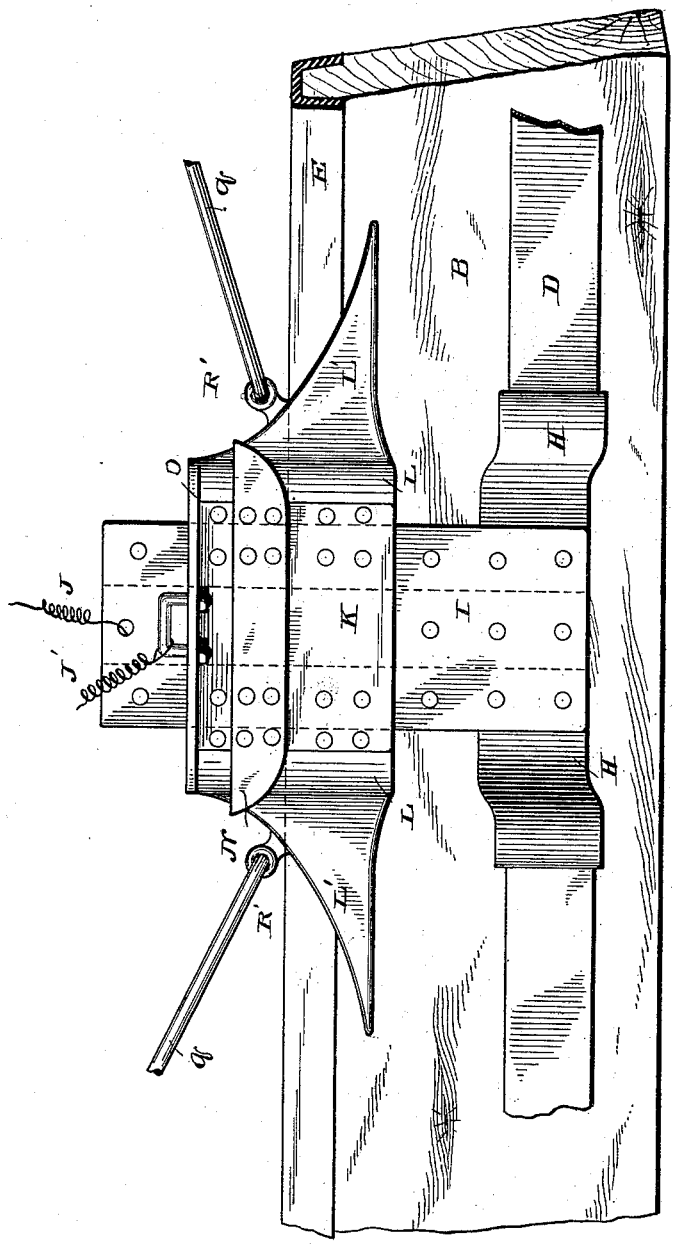
Witnesses
H. A. Lamb.
Stephen J. Jannus
Inventor
Charles J. Van Depoele
By his Attorney
Frankland Jannus

UNITED STATES PATENT OFFICE.

CHARLES J. VAN DEPOELE, OF CHICAGO, ILLINOIS.

SLOTTED CONDUIT FOR ELECTRICAL CONDUCTORS.

SPECIFICATION forming part of Letters Patent No. 405,626, dated June 18, 1889.

Application filed June 6, 1888. Serial No. 276,256. (No model.)

*To all whom it may concern:*

Be it known that I, CHARLES J. VAN DEPOELE, a citizen of the United States, residing at Chicago, in the county of Cook and State of Illinois, have invented certain new and useful Improvements in Slotted Conduits for Electric Conductors, (Case No. 3,) of which the following is a description.

My invention relates to improvements in conductors for transmitting electrical currents to traveling motors of that class in which the line-conductors are carried in a slotted conduit or tube buried between the rails of a railway-track and formed with a continuous open slot at the surface of the roadway, through which extends a device for maintaining a continuous moving contact with the conductors contained within the conduit.

In carrying out my invention I may employ two conductors located within the conduit, both of which are connected to the same pole of the supply-generator, the other pole thereof in this case being represented by continuous metallic plates secured to the exposed portions of the conduit. I contemplate also, however, using the interior conductors separately connected to poles of the supply-generator. A traveling contact device is provided extending downward through the slot and into contact with both the conductors, and said device is supported upon a pair of metallic wheels or shoes resting and traveling upon exposed portions of the conduit.

The invention relates, moreover, to various improvements in construction and arrangement, as fully hereinafter set forth, and referred to in the appended claims.

In the accompanying drawings illustrating my invention, Figure 1 is a transverse sectional elevation showing a roadway and an electrical conduit embodying my invention. Fig. 2 is a top plan view of the conduit, portions thereof being broken away to show the relative arrangement of the parts. Fig. 3 shows the conduit in elevation, portions thereof being broken away to show the interior construction. Fig. 4 is an end view partly in section. Fig. 5 is a view in elevation, showing the traveling contact device, together with a portion of one side of the conduit structure. Fig. 6 is a top plan view of the contact-carriage, one of the supporting-wheels being shown in section. Fig. 7 is a transverse sectional view of a spring-contact device in position between the main conductors. Fig. 8 is a transverse sectional view showing the conduit and contact device in relative operative positions. Fig. 9 is an elevation, partly in section and partly broken away, showing the relative positions of the contact-truck, the conduit, and the frame of the car, together with the means for coupling the contact-truck to the car. Fig. 10 is a detail view showing a modified form of connection between the contact-truck and the car. Figs. 11 and 12 are detail views illustrating modified forms of contact devices.

Similar letters denote like parts throughout.

As illustrated in the drawings, A indicates the cross-ties of the road-bed of a railway, of which $a\ a$ are the rails. The conduit is preferably in the center of the roadway, and its structure includes continuous side walls, which, for economy of construction and also on account of its insulating properties, may be formed of wooden planks of, say, three by ten inches in dimensions and joined together at their ends in any suitable manner to form the side walls B B of the conduit. The material of which the side walls B B are formed should be coated with tar or any water-proof insulating compound or substance, and for greater durability they may be creosoted or boiled in lime-water.

The side walls B B are permanently supported by metallic yokes C in downwardly-divergent positions, forming an inverted V, as seen in cross-section, and having their upper edges separated to form a continuous slot G. The yokes C are made large enough to receive said side walls and to constitute sufficiently strong and substantial supports therefor. The yokes C are formed with flanges $c'$, extending around their inner margins, upon which flanges the lower edges of the side walls rest, and against which said side walls are securely fastened by means of suitable bolts $c^2$, the said side walls being thus maintained at the desired distance apart by the yokes, which are placed at suitable intervals along the conduit, ordinarily four feet apart. In this case the exterior of the lower portion of each flange $c'$ may conveniently rest upon a cross-tie, when the whole can be still further secured by means of a bolt $c^3$ passing through the web of the yoke and into the tie. When the yokes are not secured to or resting upon the ties, as just described, or when additional ties A' are placed between those to which the yokes are secured, the said ties may be notched to receive the lower edges of the side walls, which, when in their proper positions, would otherwise rest upon said ties only upon one corner. This, while involving some additional labor, will add increased strength to the structure, although not necessary in all cases.

The electrical conductors D, which may consist of bars or rods of iron or steel faced with copper, or bars of pure copper, are supported within the conduit upon cleats $d$ $d$, secured to the side walls B, and by which said conductors are kept from contact with the said side walls and supported at a convenient height and in position intermediate between the bottom and top of the conduit. When both are connected to form one side of the circuit, the conductors D are electrically connected at intervals, as indicated in dotted lines in Fig. 7, so that in case of accident to one conductor the current will pass around the break through the remaining conductor and the flow of current not be materially interfered with.

The upper edges of the side walls B B are covered by capping-plates E E, which may be in the form of flat iron or steel bands or bars, secured along the surface of the top edges of the conduit, their upper surface being about on a level with the surface of the roadway. The said plates are secured in position by means of lag-screws $e$ or other suitable means, rendering them easily removable for replacement or repairs. As shown, the capping-plates E are formed with flanges $e'$ and $e^2$ at their sides, which flanges extend down over the upper edges of the side walls and entirely prevent any wear upon them. Since, however, said flanges are not essential to the efficiency of my improved conduit, I may omit them altogether and use flat bar metal, as shown in Fig. 9. With either construction the capping-plates are electrically connected at their ends, so that when connected to the negative pole of the generator they will constitute an efficient return-conductor. A continuous opening or slot G of, say, five-eighths of an inch in width, is left between the upper edges of the capping-plates for the insertion of a portion of a contact-truck carrying the contact device operating upon the interior conductors, as hereinafter set forth.

In order to prevent any portion of the material constituting the road-bed from working up into the bottom of the conduit, a continuous V or other shaped trough F is formed and secured to the under side of the cross-ties A. Said trough is closed at the sides by means of additional boards $f f$, which are fitted in between the cross-ties, as indicated, fitting between the upper edges of the trough F and the lower margin of the side walls B, so as to completely exclude all extraneous matter. The trough F serves to receive and carry off rain-water, slush, &c., which may enter through the slot G. The conductors are purposely placed considerably farther apart than the width of said slot, and also supported at a distance from the said side walls, so that liquids entering through said slot will either drop down between the conductors and into the trough F or run down the side walls behind the conductors, and also be eventually caught in said trough. For further protection, deflecting-boards $d'$ are secured to the inner side walls of the conduit above the conductors and serve to protect them from drip-water. Said trough will commonly be connected with catch-basins located at suitable points, or will communicate with a suitable system of sewers.

Devices for establishing and maintaining a traveling contact with the main conductors D within the conduit may be constructed in several different ways without departure from that part of my invention which relates to the line-conductors and conduit. As shown in Figs. 5, 7, 8, and 9, such devices consist of two double-ended springs H H, provided at their outer faces with contact-surfaces $h$ of very hard and durable metal—for example, chilled cast iron or steel—and arranged to bear laterally with the desired degree of pressure against the main conductors D, between which they are located. The springs H H are in this instance placed together and secured in metallic contact with each other and mechanically united at their central portion by two plates I I of insulating material—such, for example, as hard wood or vulcanized fiber. Said plates extend upward through the slot G to a point a considerable distance above the conduit. A conducting-strip H' is inserted centrally between the contact-springs H H, and carried up between the insulating-plates I I and connected to the conductor J, extending to the motor. The contact-surfaces at the extremities of the springs H H may be removable blocks or wheels of hard metal—as, for example, chilled cast-iron or hardened cast-steel—which will resist rapid wear and be readily replaced when worn out.

In Fig. 11 is shown a contact device similar to that already described, excepting that wheels or rollers $h'$ and contact-springs $i$, for collecting current from the hubs of wheels $h'$, are substituted for the rubbing-blocks $h$. In Fig. 12 is seen a slightly-modified form comprising only a single central spring $H^3$, provided at each end with a roller $h^2$ and spring-connection $i$. In this instance the central insulating support is similar to that heretofore described, except that it may be curved somewhat to one side, and the rollers $h^2$ are pressed against one conductor by a third roller $h^3$, mounted on a rigid arm secured to the middle portion of the spring H³, and thereby held in contact with the other conductor D. The portions of the insulating-plates I passing through the slot and into the conduit are inclosed between protecting-plates K, preferably of steel, which are secured thereto in any suitable manner. The front and rear edges of the protective plates K are secured to two solid metallic end pieces or nosings L, which are rounded to a sharp edge at their outer extremities, forming a species of plow capable of removing slight obstructions from the slot. Supporting and carrying devices, which may be either a pair of wheels M M, as shown in Figs. 1, 5, 6, 8, and 9, or shoes N N, as in Fig. 13, are provided. The wheels M are pivotally attached to the nosings L L by means of strong metallic brackets m m, bifurcated at their outer extremities for connection with the axles n of the wheels M. The wheels M are provided with oil-cups, or made hollow to receive a supply of oil. The axes of the wheels or rollers h' h² h³ may, however, be formed of anti-friction material, to avoid the introduction of oil into the conduit. When shoes N are used instead of wheels M, they should be removably secured to the end pieces L, which, as indicated, project downward and forward into the conduit, as at L', forming plows adapted to lift and remove stones and other obstructions from the slot. The inner ends of the lower portions or members m' of the brackets m are let into slots or recesses l, formed for their reception in each of the end pieces L, the upper portions of said brackets fitting over a stout frame-piece O, extending about and desirably resting upon the upper portions and edges of the end pieces and protective plates K. The brackets m are also provided with plows L', extending beyond the wheels M. The brackets and frame-pieces are all securely connected by pivot-bolts O', which extend through both limbs of each bracket, at opposite ends of the frame O, and into the end pieces L, affording a strong and vertically-rigid support for the contact device upon its carrying-wheels M. The several parts designated form a strong and serviceable composite contact device, hereinafter referred to as a "contact-truck."

The carrying-wheels M are supported and travel upon the capping-plates E, and are held in position thereon by means of plows L' or central ribs M', which plows or ribs travel in the slot G, keeping the wheels always in place. The contact-truck will not readily bind or pinch on the sharpest curves, on account of the pivotal connection between the central portion and the carrying-wheels. Inasmuch as the contact-wheels M M are supported upon the metallic end pieces L on the exterior of the insulating-plates I, the connection from the positive (interior) contact devices is thoroughly removed from contact therewith. The wheels M are supported upon and will always be in metallic connection with the capping-plates, not only forming a support for the other contact devices, but also, when suitably connected by conductor J, constituting a return connection independent of the track-rails or other devices.

As indicated in Fig. 9, the contact-truck is flexibly connected with the car by means of spiral springs Q Q through elastic devices which, as shown, are secured to connecting-links q q, secured to a ring or hook R, ordinarily attached to the frame O, but which may also be secured to separate loops or eyes R' R', as in Fig. 13. The links Q Q are double, so as to pass around both sides of the wheels M M and attach to hooks R on each side of the frame O, or single for connection with the eyes R' R'. Small wire ropes or chains r extend from the links q q through the springs Q, and when said springs are in their normal position extend from the outer end of said spring a short distance, and are provided with extensions r', so that should the central portion of the contact-truck meet any unusual obstruction in its passage along the slot, and its draft be thereby suddenly increased, said springs can only be extended until the extension rests against the first coil thereof, the length of the ropes r being less than the distance the springs may be expanded without injury. The extremity or last coil s of the spring Q passes through or is attached to a hook or link S, which engages a coupling-ring T attached to the car. Under unusual strain the hook S will bend and be pulled out, thus preventing other injury. A modified form of safety device consists in securing the end of spring Q to an arrow or conical-shaped plug U, provided with grooves u for engagement with a pair of stiff springs V, which are secured to the lower portion of the car-body in the same position as the hooks T, which said springs grasp the head U with sufficient force to hold it against any draft-strain that the spring Q can safely bear, additional strain beyond which point will detach the head U from the springs and prevent injury to the springs Q.

It will be obvious that various modifications and changes may be made in the hereinbefore-described structure without departing from the spirit of the invention, various elements being herein described specifically for purposes of illustration without any intention of limiting the construction in such particulars.

It will also be understood that if desired I can connect the interior conductors D D separately to opposite poles of the supply-generator, also insulating the contact-springs from each other, in which event the ends of the capping-plates need not be electrically connected, and the wheels M will serve solely to support the contact-truck.

Having described my invention, what I claim is—

1. A conduit for electrical conductors, comprising an exterior casing having side walls of insulating material, yokes for supporting and sustaining said side walls, supports arranged within the conduit and attached to the insulating side walls, and conductors secured to said supports, substantially as described.

2. A conduit for electrical conductors, comprising side walls of wood, metallic yokes within which the side walls are secured, conductors mounted between said side walls, and metallic capping-plates resting upon the upper edges of the side walls, substantially as described.

3. A conduit for electrical conductors, comprising metallic yokes located between the rails of a railway-track and sustained upon the cross-ties thereof, said yokes being provided with interior flanges for attachment to the exterior of and constituting seats, and inclined lateral supports for the side walls of the conduit, and side walls secured within said yokes at an angle from the vertical.

4. A conduit for electrical conductors, comprising metallic yokes located between the rails of a railway-track and sustained upon the cross-ties thereof, and having interior flanges at an angle from the vertical, side walls arranged within said yokes and secured against the flanges thereof, and inclined toward each other at their upper edges and provided with metallic capping-plates along their upper edges, substantially as described.

5. The combination, in a conduit for electrical conductors, of one or more electrically-connected conductors secured to insulating-supports arranged within said conduit and representing one side of the circuit, metallic capping-plates on the exterior edges of the side walls of said conduit and electrically connected to form the other side of the circuit, and a contact-truck comprising metallic wheels arranged to travel upon and in continuous contact with the capping-plates, and contact devices for continuous contact with the conductors within the conduit, substantially as described.

6. A conduit for electrical conductors, comprising side walls of insulating material, metallic yokes within which said sides are supported at the desired distance apart, metallic capping-plates secured upon the upper edges of the side walls and connected to form one side of the circuit, conductors mounted upon insulating-supports attached to the inner sides of the conduit and forming the other side of said circuit, and a contact-truck comprising supporting-wheels moving upon the exposed conductor, and an insulating contact device extending into the conduit and into contact with the interior conductors, substantially as described.

7. A contact device for electrical conduits, comprising one or more spring-actuated contacts engaging the conductors of one side of the circuit, an insulated connection and support extending therefrom and carrying wheels or contacts pivotally connected to the insulating-support and making contact with the other side of the circuit, substantially as described.

8. The combination, with a conduit for electrical conductors provided with main conductors of one polarity upon the interior thereof and conductors of opposite polarity upon the exterior thereof, of a contact device comprising a plurality of spring-supported contacts engaging the main conductors within the conduit, an insulated connection and support extending therefrom, and a carrying-wheel pivotally connected to each end of the insulating-support and making contact with the conductors upon the exterior of the conduit, substantially as described.

9. The combination, with a conduit for electrical conductors comprising a protective casing, insulated conductors of one polarity within the casing, metallic capping or surface-plates upon the exterior of the casing and connected to form the other side of the circuit, a contact device comprising a plurality of spring-supported contacts disposed between the main conductors, an insulated connection and support extending therefrom, and carrying-wheels pivotally connected to each end of the insulating-support and engaging the other side of the circuit, substantially as described.

10. A conduit for electrical conductors, comprising a protective casing, insulated conductors within the casing and representing one side of the circuit, protective metallic plates upon the exterior of the casing, said plates being connected to form the other side of the circuit, a contact device comprising a plurality of spring-actuated contacts engaging the conductors within the conduit, an insulated connection and support extending from said contact, and metallic carrying-wheels formed with a central rib or projection and pivotally connected to each end of the insulating-support and arranged to engage the exterior conductors, substantially as described.

11. The combination, with a contact-truck and a moving vehicle, of elastic draft connections extending between the truck and vehicle, an inelastic connection extending along said elastic connections and arranged to limit the expansion thereof under abnormal strain, and a detachable connection between said connections and the vehicle, substantially as described.

12. A contact-truck for electrical conduits, comprising a wheeled exterior support moving upon the surface of the conduit, insulated contact devices extending from the support into the conduit, and one or more rigid guides extending from the supports of the wheels and entering the slot in advance thereof, substantially as described.

13. A contact-truck for electrical conduits, comprising supporting-wheels moving upon the conduit, contact devices extending into the conduit, and an extension or extensions projecting into the slot in advance of the supporting-wheels for removing obstructions, substantially as described.

14. A conduit for electrical conductors, comprising walls of insulating material, conductors secured to said walls, and inwardly-extending and downwardly-inclined deflecting strips or boards above the conductors, substantially as described.

15. A conduit for electrical conductors, insulating-supports for the conductors therein, and inwardly-extending and downwardly-inclined drip-water deflecting boards or strips above the conductors, substantially as described.

In testimony whereof I hereto affix my signature in presence of two witnesses.

CHARLES J. VAN DEPOELE.

Witnesses:
FRANKLAND JANNUS,
GUSTAV HELLEBUCK.